US006573687B2

United States Patent
Kimura et al.

(10) Patent No.: US 6,573,687 B2
(45) Date of Patent: Jun. 3, 2003

(54) CHARGING/DISCHARGING CONTROL METHOD FOR SECONDARY BATTERY

(75) Inventors: Tadao Kimura, Kobe (JP); Yusai Murakami, Toyohashi (JP)

(73) Assignees: Matsushita Electric Industrial Co., Ltd., Osaka (JP); Toyota Jidosha Kabushiki Kaisha, Aichi (JP)

(*) Notice: Subject to any disclaimer, the term of this patent is extended or adjusted under 35 U.S.C. 154(b) by 0 days.

(21) Appl. No.: 09/858,353

(22) PCT Filed: Nov. 24, 1999

(86) PCT No.: PCT/JP99/06549

§ 371 (c)(1),
(2), (4) Date: May 15, 2001

(87) PCT Pub. No.: WO00/31818

PCT Pub. Date: Jun. 2, 2000

(65) Prior Publication Data

US 2001/0033150 A1 Oct. 25, 2001

(30) Foreign Application Priority Data

Nov. 24, 1998 (JP) .......................................... 10-332990

(51) Int. Cl.$^7$ ................................................. H02J 7/00
(52) U.S. Cl. .................................................... 320/132
(58) Field of Search ................................. 320/118, 119, 320/132, 149; 324/427, 432, 433, 426

(56) References Cited

U.S. PATENT DOCUMENTS

| 4,958,127 | A | * | 9/1990 | Williams et al. ............. 324/426 |
| 5,049,803 | A | * | 9/1991 | Palanisamy ................... 320/132 |
| 5,187,424 | A | * | 2/1993 | Benz et al. .................... 320/132 |
| 5,578,915 | A | | 11/1996 | Crouch, Jr. et al. ......... 324/428 |
| 5,629,601 | A | * | 5/1997 | Feldstein ....................... 320/119 |
| 5,786,640 | A | * | 7/1998 | Sakai et al. ................... 320/104 |
| 5,905,360 | A | | 5/1999 | Ukita ............................ 320/118 |
| 5,990,662 | A | * | 11/1999 | Yang ............................. 320/132 |
| 5,998,969 | A | | 12/1999 | Tsuji et al. ................... 320/132 |
| 6,043,628 | A | * | 3/2000 | Perelle et al. ................. 320/119 |
| 6,094,033 | A | * | 7/2000 | Ding et al. .................... 320/132 |

FOREIGN PATENT DOCUMENTS

| JP | 10-66267 | 3/1998 |
| JP | 10-322925 | 12/1998 |
| JP | 2000164260 | * 6/2000 |

\* cited by examiner

Primary Examiner—Edward H. Tso
Assistant Examiner—Pia Tibbits
(74) Attorney, Agent, or Firm—Jordan and Hamburg LLP

(57) ABSTRACT

A battery pack is formed by serially connecting a plurality of cells, that are individually constructed as rechargeable batteries. Charging and discharging of this battery pack are controlled such that, the proportion of discharge current with respect to the charge current equals to a value obtained by multiplying the charge current by a charging efficiency corresponding to a target SOC value.

4 Claims, 4 Drawing Sheets

CHARGING/DISCHARGING CONTROL METHOD FOR SECONDARY BATTERY

TECHNICAL FIELD

The present invention relates to a charge and discharge control method for equalizing at an intermediate state the states of charge (SOC) of each of a plurality of cells which together constitute a battery pack, in which the cells that are individually constructed as rechargeable battery are connected in series.

BACKGROUND ART

State of charge (SOC) of a rechargeable battery is defined as the proportion of the quantity of electricity that is charged in the rechargeable battery relative to the electrical capacity of the battery. The SOC varies depending on the temperature of the battery or the variance of the characteristics of each of the individual cells. Therefore, in the case where a plurality of cells are connected in series to constitute a battery pack, there will be differences between the SOCs of each of the cells.

As a technique for equalizing the SOCs of each individual cell that constitutes a battery pack, particularly for a rechargeable battery using lead or nickel in which an electrolyte of aqueous solution type is used, a method of equalizing the differential between the cells with low SOCs and those with high SOCs by charging the entire battery pack in a state of overcharge is adopted in prior art. In the case of rechargeable battery using lithium which cannot be overcharged, a charging circuit is used for controlling charging of each of the cells.

However, since equalization of the SOC of each cell by overcharging leads to deterioration of the rechargeable battery, there is a limit to the number of conducting overcharging, and therefore constant equalization of SOCs cannot be achieved by this method. The method of controlling the charging of each of the cells that constitute the battery pack is not practical, since it entails complicated construction of charging circuit and its control circuit, which causes considerable raise in cost. In the application wherein the rechargeable battery is recharged by recovering energy during idling of an internal combustion engine, braking, or coasting, such as in a hybrid vehicle which uses an electric motor and an internal combustion engine in combination as power sources, or in a hybrid bicycle wherein the pedaling action by human power is supplemented by a power from an electric motor, it is necessary to maintain the SOCs of the rechargeable batteries at an intermediate level; thus equalization of SOCs is essential. In such applications the method by overcharging as mentioned above cannot be adopted, and the method of controlling the charging of individual cells is not suitable either, because of its high device cost and difficulty in management of charging.

An object of the present invention is to provide a method of controlling charging and discharging of a rechargeable battery for equalizing the SOCs of each of the cells that constitute a battery pack, without using a method that leads to deterioration of the battery, or without increasing the device cost.

DISCLOSURE OF THE INVENTION

To achieve the above object, the present invention provides a method of controlling charge and discharge of a rechargeable battery for a battery pack wherein a plurality of cells, individually constructed as rechargeable battery, are connected in series, for equalizing the state of charge of each of the cells, characterized in that: a charging efficiency of the rechargeable battery corresponding to a target value of SOC is obtained, and the battery pack is charged and discharged repeatedly such that the proportion of a discharging amount with respect to a charging amount is equal to the obtained charging efficiency.

Charging efficiency is an index of how much quantity of electricity used for charging is stored in the rechargeable battery. The charging efficiency is high when the SOC of the rechargeable battery is low, whereas it is low when the SOC is high. Therefore, if the battery pack which is in a state wherein each of the serially connected cells has different SOCs is charged and discharged repeatedly such that the proportion of the discharge amount with respect to the charge amount is equal to the charging efficiency corresponding to the target value of SOC, when the battery pack is charged, the cells with an SOC lower than the target SOC will be charged with more electricity by the amount of differential in the charging efficiency, while the cells having an SOC higher than the target SOC will be charged with less electricity by the amount of differential in the charging efficiency. On the other hand, when the battery pack is discharged, all of the cells are uniformly discharged by the amount obtained by multiplying the charging amount by the charging efficiency. Accordingly, the cells having an SOC lower than the target SOC will have more stored charge by the charged electricity corresponding to the differential in the charging efficiency, while the cells having an SOC higher than the target SOC will have less stored charge by the amount of electricity corresponding to the differential in the charging efficiency. By repeating charge and discharge as described above, the SOC of the cells that was lower than the target SOC increases gradually toward the target level, while the SOC of the cells that was higher than the target SOC decreases gradually toward the target level. Accordingly, by continuing such cycles of charging and discharging, the SOCs of each of the cells can be equalized.

BEST MODE FOR CARRYING OUT THE INVENTION

Preferred embodiments of the present invention will be hereinafter described with reference to the accompanying drawings for the understanding of the present invention. The embodiments described below are only examples and do not limit the technical scope of the present invention.

A charge and discharge control method according to a first embodiment of the present invention is applied for equalizing at an intermediate state the states of charge (SOC) of each of a plurality of individual nickel metal hydride battery cells which together comprise a battery pack, in which the individual cells are serially connected to obtain a desired output power; the method is intended to be applied to a battery power source device for powering electric motors in hybrid vehicles that use both an electric motor and an internal combustion engine as the drive power source. When the SOC of the battery pack which is used as a battery power source device for the above-mentioned hybrid vehicle falls below a predetermined value, the battery pack will be recharged by the output power obtained from an electric generator driven by the internal combustion engine. In addition, energy recovered during braking and coasting is used as power to charge the battery power source device, so as to use the energy effectively. Therefore, to use this recovered energy effectively when charging is required, the SOC of the individual cells which form the battery pack that serves as the battery power source device must be equalized at an intermediate state.

A charge and discharge control method for equalizing at an intermediate state the SOCs of the individual cells which form the battery pack is described hereinbelow. Five individual nickel metal hydride battery cells are serially connected to form a battery pack with a capacity of 10 Ah. One example will be shown, wherein the SOCs of the individual cells are set unequally at 40%, 45%, 50%, 55%, and 60% respectively, and then a charge and discharge control method as described below according to first and second embodiments of the present invention is used to equalize the SOC of the individual cells to a target value of 50%.

Figure 1:
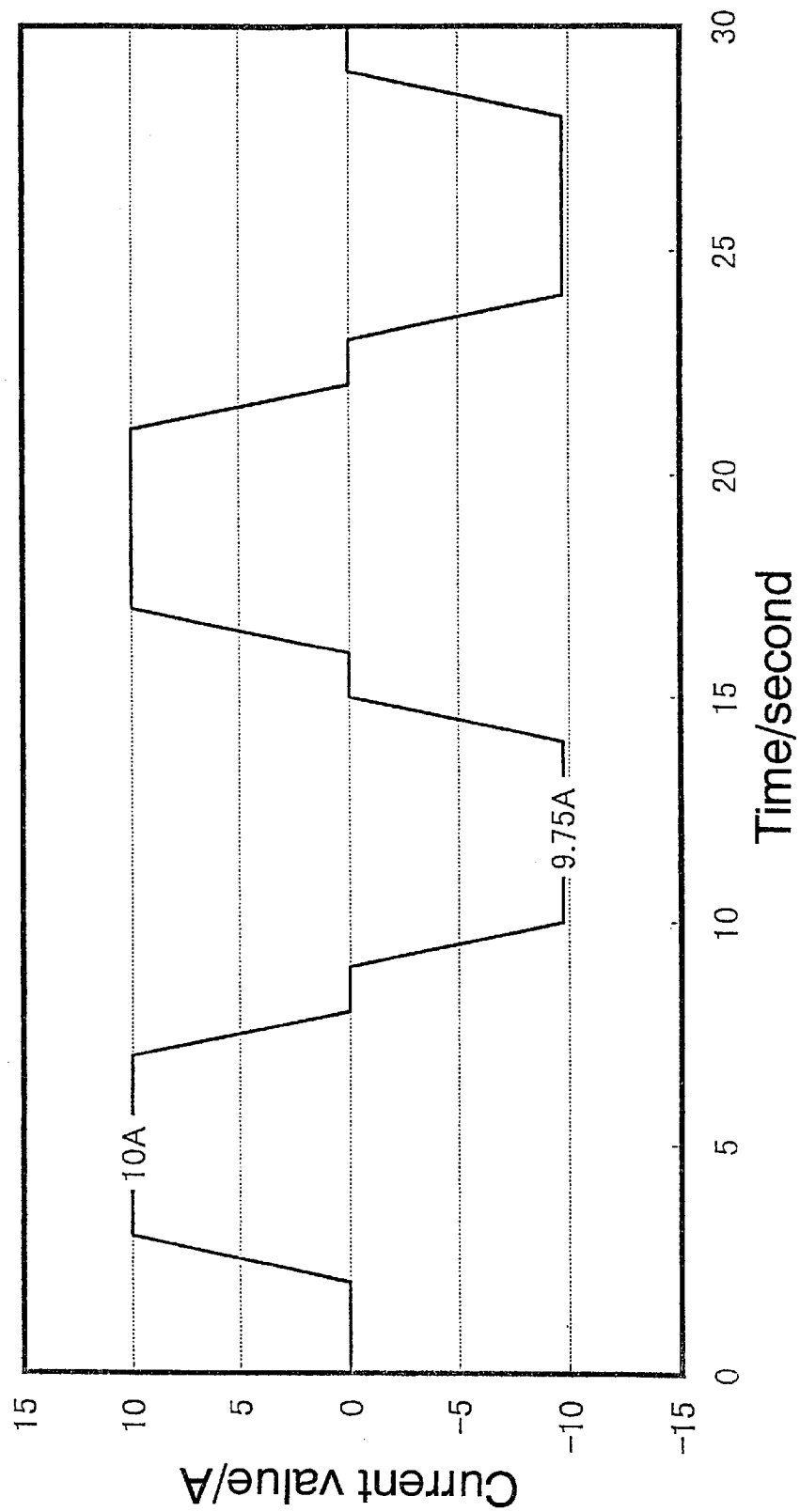
FIG. 1 is a waveform chart showing a charge/discharge control method according to a first embodiment of the present invention.
Figure 2:
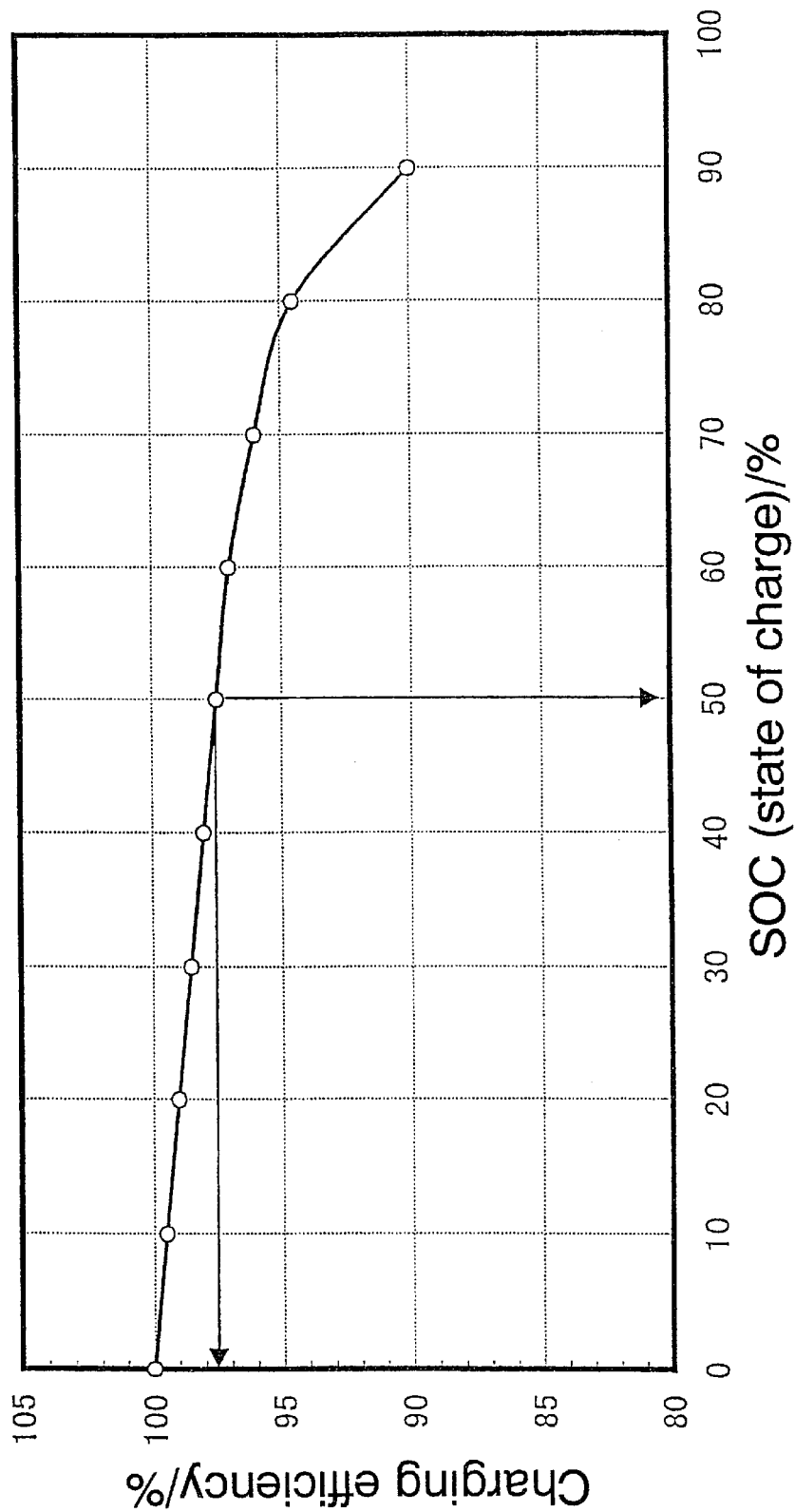
FIG. 2 is a graph showing the charging efficiency of a rechargeable battery in the first and second embodiments of the present invention.

First, in this embodiment, as shown in FIG. 1, the abovementioned battery pack is charged for approximately six seconds at a charge current of 50 A, after which discharging is carried out at a discharge current of 48.75 A, which is a value obtained by multiplying the aforementioned charging current value by 97.5%, which is the charging efficiency obtained when the target SOC is 50% (FIG. 2). The charging and discharging is repeated for two hours. The abovementioned charging efficiency indicates the efficiency of storage of quantity of electricity. For example, as shown in FIG. 2, when an SOC is 0%, the charging efficiency is 100%, and the charging efficiency decreases as the SOC increases.

Therefore, when an SOC of 50% is established as the target equalization value, the charging efficiency of individual cells with an SOC of less than 50% will be higher than that of individual cells having an SOC of 50%, which results in a greater stored charge. Conversely, the charging efficiency of individual cells with an SOC of greater than 50% will be lower than that of individual cells having an SOC of 50%, which results in a lesser stored charge.

At a discharge current determined by multiplying the charging efficiency by the charge current, however, the individual cells will discharge uniformly over the same span of time as that over which they were charged, irrespective of charging efficiency or SOC. Therefore, individual cells with an SOC of 50% will have the same charge and discharge quantities and as such will return to their original SOC of 50% once the amount of charge accumulated during charging has been discharged. Individual cells having an SOC of less than 50% will accumulate a greater charge during charging than will individual cells having an SOC of 50% and will therefore have a greater quantity of accumulated charge when each cell is uniformly discharged, resulting in an increased SOC. On the other hand, individual cells having an SOC of greater than 50% will have less accumulated charge during charging than will individual cells having an SOC of 50%, and when each cell is uniformly discharged therefore the discharge quantity will be large, which will lead to a decreased SOC.

Figure 3:
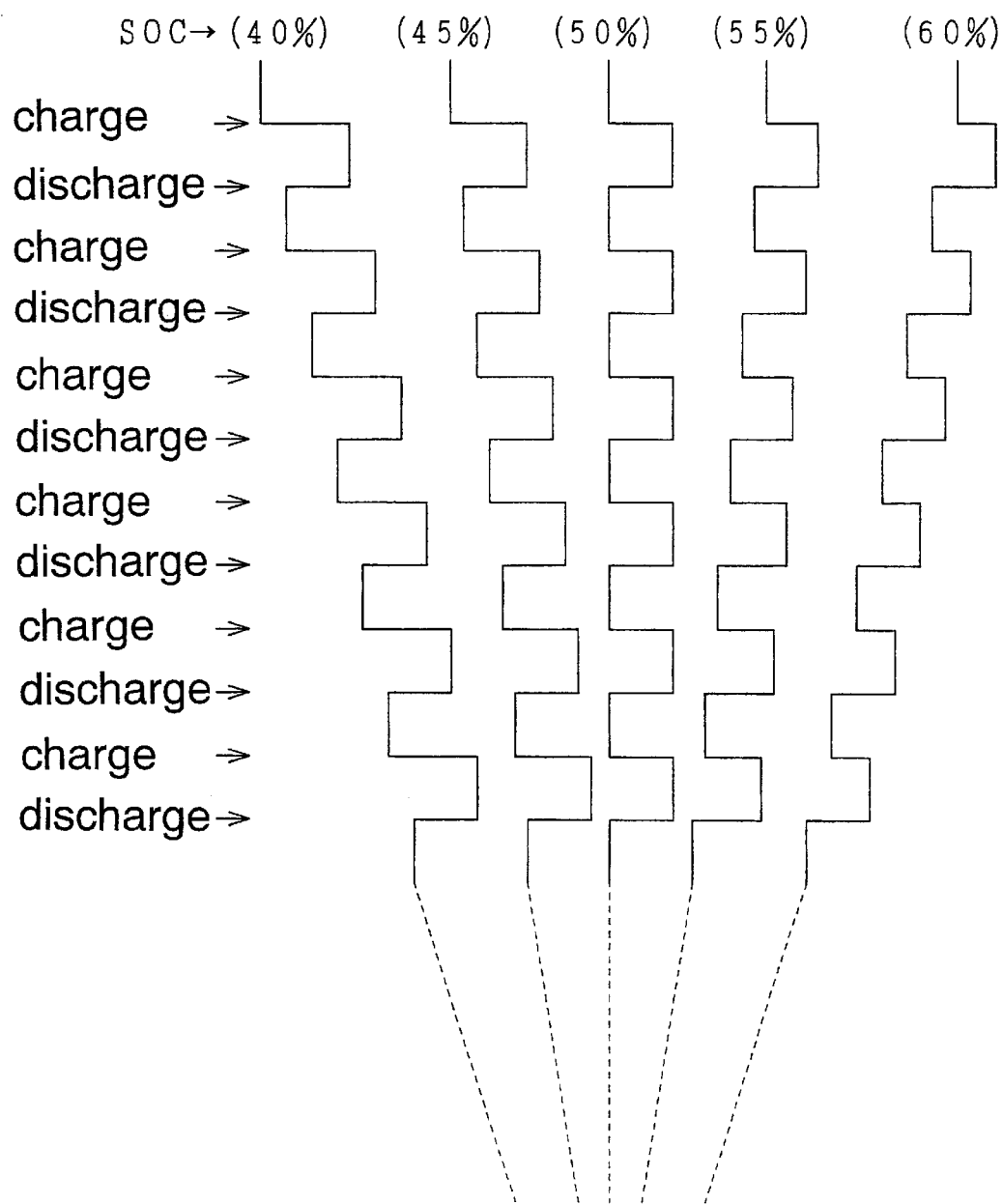
FIG. 3 is a diagram showing the model of how the SOC changes as charging and discharging are repeated.

FIG. 3 shows a typical example of the change in the SOC of the respective cells when charging and discharging as described above are repeated. Individual cells with an SOC of 50% maintain the 50% state, while cells with an SOC of less than 50% will undergo an increase in the SOC as the accumulated charge gradually increases with each charge and discharge. On the other hand, individual cells with an SOC of greater than 50% will undergo a decrease in the SOC as the accumulated charge gradually decreases with each charge and discharge. Continuously repeating the charging and discharging will equalize the SOC for each individual cell as the target SOC of 50% is attained.

The charging and discharging as stipulated according to the this embodiment were repeated for two hours, resulting in the above-mentioned SOC values for the individual cells of 47%, 49%, 50%, 51%, and 53% respectively. The SOC values, which varied by up to 20%, were reduced to a 6% maximum variance, which accordingly brought the equalized values within the allowable range for battery use.

Figure 4:
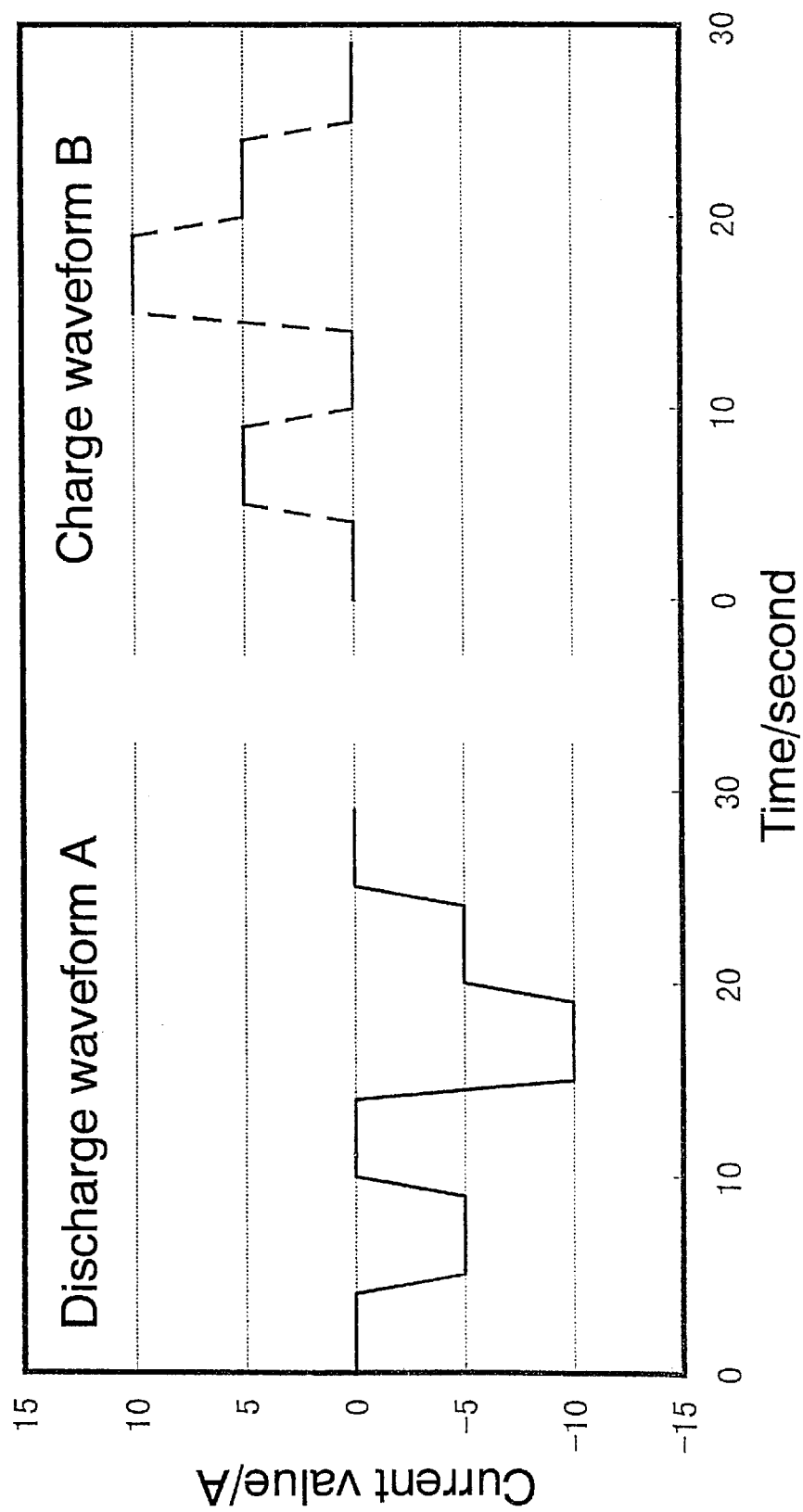
FIG. 4 is a waveform chart showing a charge/discharge control method according to a second embodiment of the present invention.

Next, in a second embodiment of the present invention, charging and discharging control is carried out on the abovementioned battery pack according to the charging and discharging waveforms shown in FIG. 4. As shown in FIG. 4, control is repeatedly carried out by discharging the cells three times at currents of 25 A, 50 A and 25 A and then charging them three times at the same currents of 25 A, 50 A, and 25 A. The current sum for the above discharging cycles is obtained by multiplying the current sum of the above charging cycles by 97.5%, which is the charging efficiency value when the SOC is 50%. The charging and discharging is repeated for 2 hours.

Discharging is performed when the quantity of electricity to be discharged is equal to the quantity of electricity to be charged multiplied by 97.5%, which is the charging efficiency when the SOC is 50%. Therefore, the individual cells with an SOC of less than 50% will have a higher charging efficiency than those with an SOC of 50%, and the SOC value will increase each time charging and discharging are repeated. Conversely, individual cells with an SOC of greater than 50% will have a lower charging efficiency than those with an SOC of 50%, and the SOC value will decrease each time charging and discharging are repeated. The charging and discharging as described above were repeated for two hours, resulting in SOC values for the individual cells of 46%, 48%, 50%, 52%, and 54% respectively. The SOC values, which varied by up to 20%, were reduced to a 8% maximum variance, and the equalized values therefore came within the allowable range for battery use.

The charging and discharging waveform does not necessarily need to be set to the waveforms shown in FIG. 4, nor does the waveform during discharging need to be symmetrical to the waveform during charging. It is essential, however, for the waveforms to be so related as to have the discharge current sum according to discharging waveform A be less than the charging current sum according to charging waveform B (A<B), and therefore the discharge current sum should be set as the value obtained by multiplying the charge current sum by the charging efficiency corresponding to the target SOC.

Industrial Applicability

As described above, according to the present invention, in a rechargeable battery constructed as part of a battery pack wherein a plurality of cells are connected in series, it is possible to equalize the SOCs of each of the cells at an intermediate level. Therefore, the present invention is advantageous particularly for use in a hybrid vehicle or the like which involves charging of battery by the recovery of energy, as the means for improving energy efficiency of the rechargeable battery.

What is claimed is:

1. A method for maintaining a predetermined state of charge of a battery pack, including equalizing states of charge of individual cells of the battery pack, comprising:

determining a charging efficiency of the cells at said predetermined state of charge; and repetitively charging and discharging said battery pack wherein:

said charging includes delivering a predetermined amount of charge to the battery which is less than that necessary to charge the battery pack to a 100% state of charge; and said discharging includes draining a discharge amount of charge equal to said predetermined amount multiplied by said charging efficiency of the cells at said predetermined state of charge.

2. The method of claim 1 wherein:

said charging includes applying a charge current over a charge time period to deliver said predetermined amount of charge; and said discharging includes draining a discharge current over a discharge period of time equal to said charge time period, wherein said discharge current is equal to said charge current multiplied by said charging efficiency.

3. The method of claim 2 where said discharge and charge currents are maintained at a substantially constant value during said discharging and said charging.

4. The method of claim 1 wherein:

said charging includes applying a charge current profile over a charge time period to deliver said predetermined amount of charge; and said discharging includes draining a discharge current profile, equal to said charge current profile, over a discharge period of time to discharge a discharge amount of charge equal to said predetermined amount of charge multiplied by said charging efficiency.

* * * * *